United States Patent
Andert et al.

(10) Patent No.: US 7,612,762 B2
(45) Date of Patent: *Nov. 3, 2009

(54) METHOD AND SYSTEM FOR NAVIGATING WITHIN AN IMAGE

(75) Inventors: Markus Andert, Nordstemmen (DE); Christine Kocourek, Munich (DE)

(73) Assignee: Palm, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/968,794

(22) Filed: Jan. 3, 2008

(65) Prior Publication Data

US 2008/0100643 A1      May 1, 2008

Related U.S. Application Data

(63) Continuation of application No. 10/478,627, filed as application No. PCT/DE02/01571 on Apr. 30, 2002, now Pat. No. 7,339,573.

(30) Foreign Application Priority Data

May 23, 2001   (DE) ................. 101 25 395

(51) Int. Cl.
G06F 3/033 (2006.01)
G09G 5/08 (2006.01)

(52) U.S. Cl. .............. 345/157; 345/671; 715/864

(58) Field of Classification Search ........... 345/661, 345/671, 157; 715/671, 855, 859, 864, 857
See application file for complete search history.

(56) References Cited

U.S. PATENT DOCUMENTS

| 4,988,981 | A | 1/1991 | Zimmerman et al. |
| 6,446,198 | B1 | 9/2002 | Sazegari |
| 6,466,198 | B1 * | 10/2002 | Feinstein ............. 345/158 |
| 2002/0008774 | A1 | 1/2002 | Yata et al. |

FOREIGN PATENT DOCUMENTS

| DE | 199 63 764 A1 | 7/2001 |
| EP | 0 880 090 A2 | 11/1998 |
| EP | 0 883 054 A2 | 12/1998 |
| GB | 2 333 215 A | 7/1999 |

OTHER PUBLICATIONS

XP-002252870—Dobe Acrobat Reader 3.0.
XP-002252869—The Most Complete Reference Special Edition Using Excel Version 5 for Windows.
Microsoft Word Illustration, 1983-1999, Microsoft Corporation.

* cited by examiner

*Primary Examiner*—Amr Awad
*Assistant Examiner*—Michael Pervan
(74) *Attorney, Agent, or Firm*—K&L Gates, LLP

(57) ABSTRACT

The present invention relates to at least one image section which is represented according to a zoom factor selected from a number of different zoom factors. Either the represented image section is changed when the zoom factor is lower than a zoom threshold value, or a marker representation superimposing the image section is displaced when the zoom factor is higher than a zoom threshold value, via input elements.

17 Claims, 2 Drawing Sheets

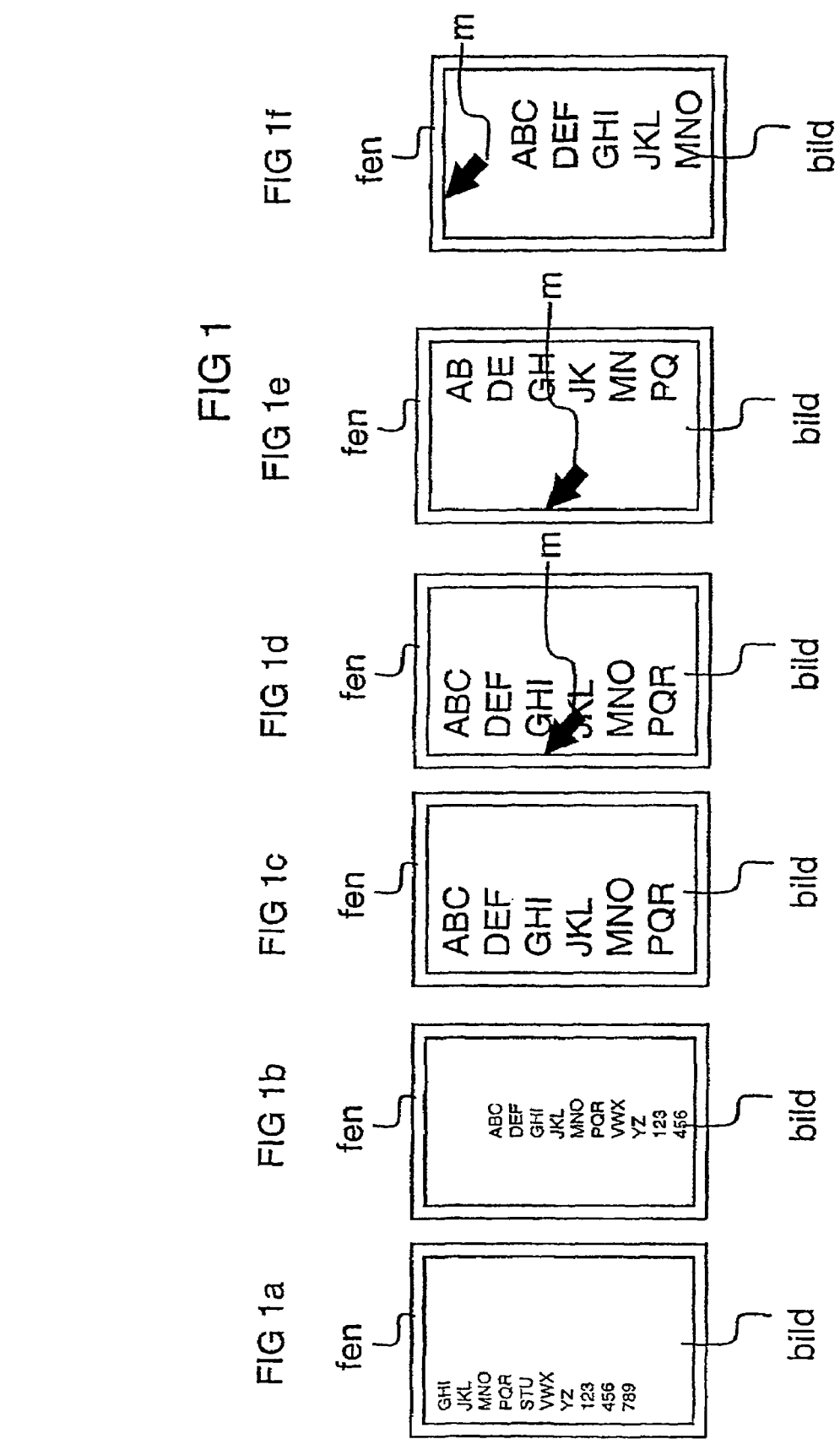

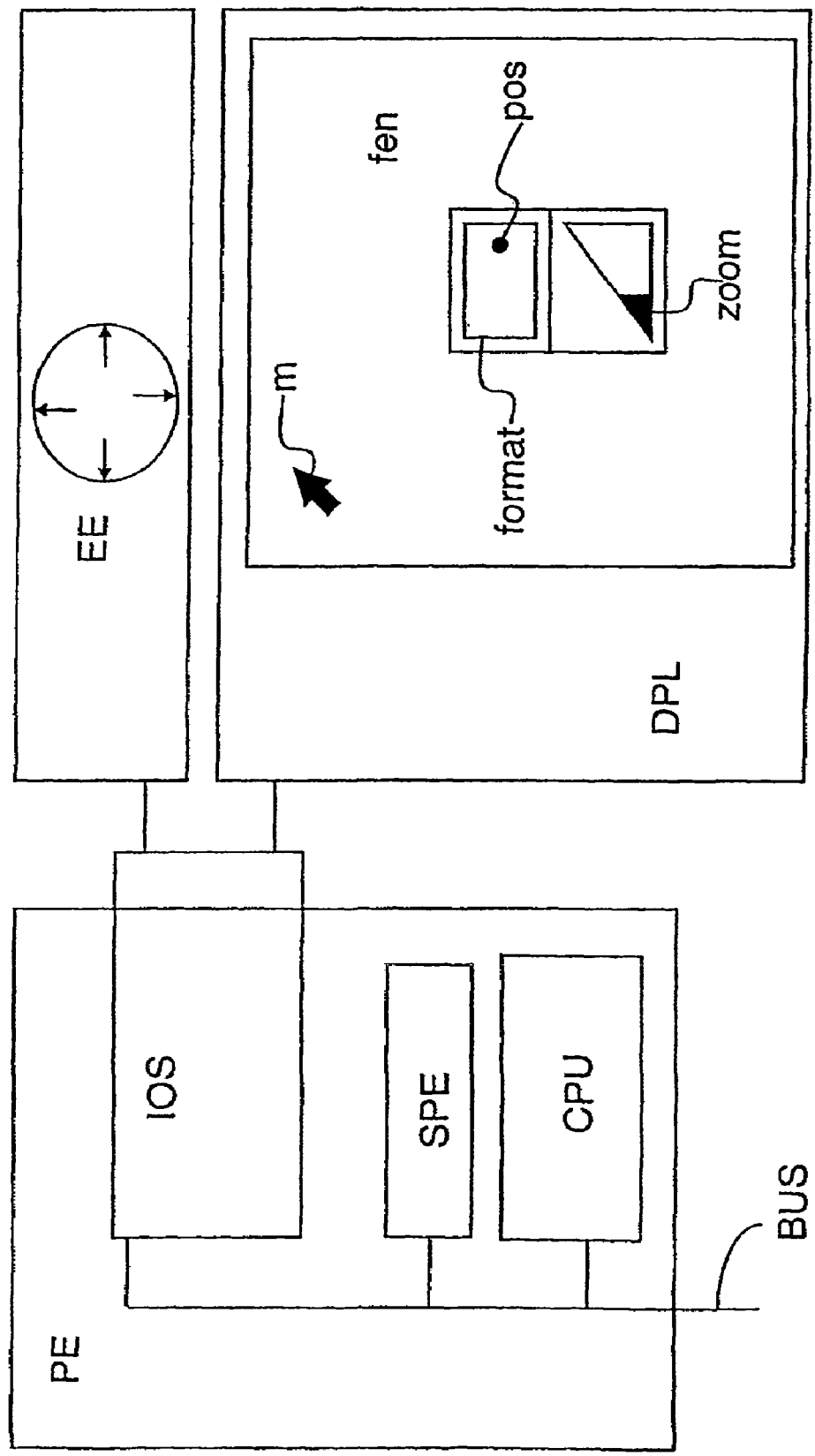

METHOD AND SYSTEM FOR NAVIGATING WITHIN AN IMAGE

This application is a continuation of, claims priority to and claims the benefit of U.S. patent application Ser. No. 10/478,627 filed on Nov. 11, 2003, the entire contents of which are incorporated herein.

BACKGROUND

The present invention relates to a method and a system for navigating within an image displayed specifically segment-by-segment according to a zoom factor.

Rapid technical progress in the field of mobile communications has led in recent years to the development and provision of a large number of different mobile telephones which, however, generally have a small-area display. Future mobile telephones will be able to receive Internet content such as html pages via the mobile radio network. To show such pages on the small-area displays, it will be necessary to display them segment by segment. This can be implemented in a practical manner by using suitable navigation functions; in particular, suitable zoom and scrolling functions. However, convenient handling of such navigation functions, particularly in the case of portable devices such as mobile telephones, precludes a high degree of miniaturization.

An object of the present invention therefore, is to provide a method and a system allowing the user to navigate conveniently within an image, particularly where space is at a premium.

SUMMARY

According to the present invention, at least one image segment is displayed according to a zoom factor. Input elements are used either to change the displayed image segment if the zoom factor is less than a zoom threshold value or to move a marker display superimposed on the image segment if the zoom factor is greater than a zoom threshold value.

The term "image" also encompasses text or Internet content such as ehtml pages, the image being displayable, for example, segment by segment within a window forming a frame represented on a display. Changing an image segment also includes moving it beyond window boundaries, the portion of the image lying outside the window no longer being displayed, which is also known as "scrolling" in the case of texts, in particular.

Specifically, using the same input element for both changing the image segment and moving the marker allows the following convenient and intuitive navigation through an image displayed on a portable device:

First, the input element is used to roughly select the desired image segment at a low zoom factor (i.e., overviewable but imprecise display of the image), by changing or moving the displayed image segment or by scrolling through the image. When the required image segment is displayed, the zoom factor is increased (e.g., automatically after a pre-defined time or manually by user entry of the zoom factor), causing the image to be displayed less overviewably but the corresponding image segment to be displayed more precisely. If the zoom factor is greater than a zoom threshold value, the input element is used to move the marker now displayed. According to embodiments of the present invention, menu items or html links can be selected by the marker, or further movement of the image segment is possible when the marker is placed in a corresponding pre-defined border zone of the window.

To achieve the object, there is additionally provided a system specifically set up to perform the method according to the present invention or one of its developments.

Additional features and advantages of the present invention are described in, and will be apparent from, the following Detailed Description and the Figures.

BRIEF DESCRIPTION OF THE FIGURES

FIG. 1 illustrates the operation of an embodiment of the present invention.

FIG. 2 is a block diagram of an embodiment of a system according to the present invention.

DETAILED DESCRIPTION

FIG. 1 shows a window represented in a display in five different stages of an exemplary embodiment of a method according to the present invention for navigating through a text.

FIG. 1a shows text (image) displayed at a zoom factor lower than a pre-defined zoom threshold value. By actuating the input element, the image display is moved in such a way that the image segment (ABC) of interest is displayed (FIG. 1b). The zoom factor is now increased (e.g., manually via a suitable user input or automatically after a time lapse), in order to display the required image segment (ABC) more precisely (FIG. 1c). If the zoom factor is greater than a pre-defined zoom threshold value, a marker m is superimposed on the displayed image segment (image) (FIG. 1d). In addition, actuating the input element no longer results in the image segment (image) being moved but in the marker m being moved. According to an embodiment of the present invention, however, moving the image display takes place when the marker is located in a corresponding border zone of the window. Thus, for example, the image display is moved to the right when the marker is located in a pre-defined left-hand border zone of the window (FIG. 1e) and the image display is shifted downward when the marker is placed in a pre-defined upper border zone of the window (FIG. 1f). When navigating through an html page or a corresponding Internet page in another format, it is possible to mark Internet links using the marker and to select Internet links by actuating an input element; in particular, the input element also used to move the marker.

FIG. 2 shows an embodiment of a system according to the present invention, the arrangement being, for example, part of a mobile telephone or of a portable computer.

To control the system, the representation of display contents and the processes implemented by the system, there is provided a program-controlled processor device PE, such as a microcontroller which can also incorporate a processor CPU and a storage device SPE.

Depending on the system, other components assigned to the processor device, belonging to the processor device, controlled by the processor device or controlling the processor device, such as a digital signal processor or further memory devices, can be disposed inside or outside the processor device PE—components whose basic operation in conjunction with a processor device will be sufficiently well-known to a person skilled in the art and which, therefore, will not be described in greater detail here.

There is additionally provided an input element EE which can be implemented by a so-called four direction switch, a joystick, a touchpad, a trackball or equivalent items.

To display a window framing an image or an image segment, there is provided a display DPL on which there is displayed on the window (superimposed on the image segment) or alongside the window, in addition to a marker (or pointer) m, a first display element (format) which reproduces the format (e.g., portrait or landscape), of the entire image to be displayed.

In addition, the display DPL is used to display a second display element, a portion of which (zoom) is highlighted, the portion being selected as a function of the current zoom factor of the representation of the image segment. The highlighted portion increases, for example, linearly with the zoom factor.

A third display element pos is used to display the position of the displayed image segment within the overall image, the position of the third display element relative to a reference point of the first display element being determined by the position of the marker display relative to a reference point of the image.

The different components of the system can exchange data with the processor CPU via a bus system BUS or input/output interfaces IOS and, if necessary, suitable controllers.

Depending on the embodiment, the storage device SPE, which can also be one or more volatile and/or nonvolatile memory chips, or parts of the storage device SPE, can be implemented as part of the processor device PE (shown in FIG. 2) or can be implemented as an external storage device (not shown in FIG. 2) located outside the processor device PE. The program data, such as the control commands or control procedures used for controlling the system or for controlling the processes carried out on the basis of the system, are stored in the storage device SPE.

In addition to the embodiments of the present invention explained above, there are a large number of other embodiments coming within the scope of the present invention that are not described further here but which can be easily translated into practice on the basis of the exemplary embodiments illustrated herein.

Indeed, although the present invention has been described with reference to specific embodiments, those of skill in the art will recognize that changes may be made thereto without departing from the spirit and scope of the present invention as set forth in the hereafter appended claims.

The invention is claimed as follows:

1. A method for navigating within an image, the method comprising:
   displaying at least one image segment according to a zoom factor;
   changing the displayed image segment using an input element if the zoom factor is less than a zoom threshold value;
   setting the displayed image segment when the zoom factor is greater than the zoom threshold value; and
   moving a marking point corresponding to the set image segment using the input element when the zoom factor is greater than the zoom threshold value and without changing the image segment being displayed when the marking point is not located in a corresponding border zone of the image segment and changing the image segment when the marking point is located in a corresponding border zone of the image segment.

2. The method of claim 1, wherein the at least on image segment is displayed on a mobile telephone.

3. The method of claim 1, wherein the at least one image segment is indicative of Internet content.

4. The method of claim 3, wherein the Internet content is at least a portion of an HTML page.

5. The method of claim 4, wherein the HTML page is received via a mobile radio network.

6. The method of claim 1, further comprising increasing the zoom factor automatically in response to changing the displayed image segment.

7. The method of claim 1, further comprising selecting a menu item using the marking point.

8. The method of claim 1, further comprising selecting an html link using the marking point.

9. The method of claim 1, wherein the input element includes a four direction switch.

10. The method of claim 1, wherein the input element includes a joystick.

11. The method of claim 1, wherein the input element includes a touchpad.

12. The method of claim 1, wherein the input element includes a trackball.

13. The method of claim 1, further comprising displaying a window frame that reproduces the format of an entire image associated with the image segment.

14. The method of claim 13, wherein the window frame is superimposed on the image segment.

15. The method of claim 13, wherein the window frame is displayed alongside the image segment.

16. The method of claim 13, further comprising displaying a position element inside the window frame indicative of the marking point position.

17. The method of claim 1, further comprising displaying an element with a portion of the element being indicative of the zoom factor.

* * * * *